United States Patent
Song et al.

(10) Patent No.: US 10,910,637 B2
(45) Date of Patent: Feb. 2, 2021

(54) POSITIVE ELECTRODE FOR LITHIUM SECONDARY BATTERY AND LITHIUM SECONDARY BATTERY INCLUDING THE SAME

(71) Applicant: LG Chem, Ltd., Seoul (KR)

(72) Inventors: Jooyong Song, Daejeon (KR); Seok Koo Kim, Daejeon (KR); In Chul Kim, Daejeon (KR); Ju Ri Kim, Daejeon (KR); Myung Ki Lee, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/344,196

(22) PCT Filed: Jun. 27, 2018

(86) PCT No.: PCT/KR2018/007313
§ 371 (c)(1),
(2) Date: Apr. 23, 2019

(87) PCT Pub. No.: WO2019/004731
PCT Pub. Date: Jan. 3, 2019

(65) Prior Publication Data
US 2020/0227729 A1  Jul. 16, 2020

(30) Foreign Application Priority Data

Jun. 27, 2017  (KR) .................. 10-2017-0081273
Jun. 27, 2018  (KR) .................. 10-2018-0074359

(51) Int. Cl.
*H01M 4/36* (2006.01)
*H01M 4/38* (2006.01)
(Continued)

(52) U.S. Cl.
CPC ............ *H01M 4/362* (2013.01); *H01M 4/386* (2013.01); *H01M 4/525* (2013.01); *H01M 4/626* (2013.01); *H01M 10/0525* (2013.01)

(58) Field of Classification Search
None
See application file for complete search history.

(56) References Cited

U.S. PATENT DOCUMENTS

2014/0212755 A1   7/2014  Wu et al.
2016/0293951 A1*  10/2016  Lim .................. H01M 4/502
(Continued)

FOREIGN PATENT DOCUMENTS

CN    104009204 A    8/2014
JP    2003306330 A   10/2003
(Continued)

OTHER PUBLICATIONS

KR-100515029-B1 English machine translation. (Year: 2005).*
(Continued)

*Primary Examiner* — Scott J. Chmielecki
(74) *Attorney, Agent, or Firm* — Lerner, David, Littenberg, Krumholz & Mentlik, LLP

(57) ABSTRACT

Provided are a positive electrode and a lithium secondary battery which have high energy capacity and include a nickel-containing positive electrode active material, and an additive including metal particles and lithium oxide.

15 Claims, 1 Drawing Sheet

(51) Int. Cl.
H01M 4/62 (2006.01)
H01M 4/525 (2010.01)
H01M 10/0525 (2010.01)

(56) References Cited

U.S. PATENT DOCUMENTS

2016/0365566 A1* 12/2016 Cui .................. H01M 4/62
2016/0372784 A1  12/2016 Hayner et al.

FOREIGN PATENT DOCUMENTS

| JP | 2004186130 A | | 7/2004 |
|---|---|---|---|
| JP | 2008117758 A | | 5/2008 |
| JP | 2018120839 A | | 8/2018 |
| KR | 100515029 B | | 9/2005 |
| KR | 100515029 B1 | * | 9/2005 |
| KR | 20120027707 A | | 3/2012 |
| KR | 101181848 B1 | | 9/2012 |
| KR | 20150026864 A | | 3/2015 |
| KR | 20160010550 A | | 1/2016 |
| KR | 101625822 B1 | | 5/2016 |

OTHER PUBLICATIONS

International Search Report for PCT/KR2018/007313, dated Oct. 30, 2018.
Dupont, et al., Mesoporous Cr2O3 as negative electrode in lithium batteries: TEM study of the texture effect on the polymeric layer formation, Journal of Power Sources, Nov. 2007, pp. 502-509, vol. 175, XP022361667.
Dupont, et al., Structure, texture and reactivity versus lithium of chromium-based oxides films as revealed by TEM investigations, Journal of Power Sources, Jan. 2007, pp. 839-848, vol. 164, No. 2, XP005737140.
Extended European Search Report including Written Opinion for Application No. EP18822950.4, dated Jan. 21, 2020, pp. 1-7.
Glavee, et al., Clusters of Immiscible Metals. 2. Magnetic Properties of Iron-Lithium Bimetallic Particles, Chemistry of Materials, Nov. 1992, pp. 1360-1363, vol. 4, No. 6, XP055656117.

* cited by examiner

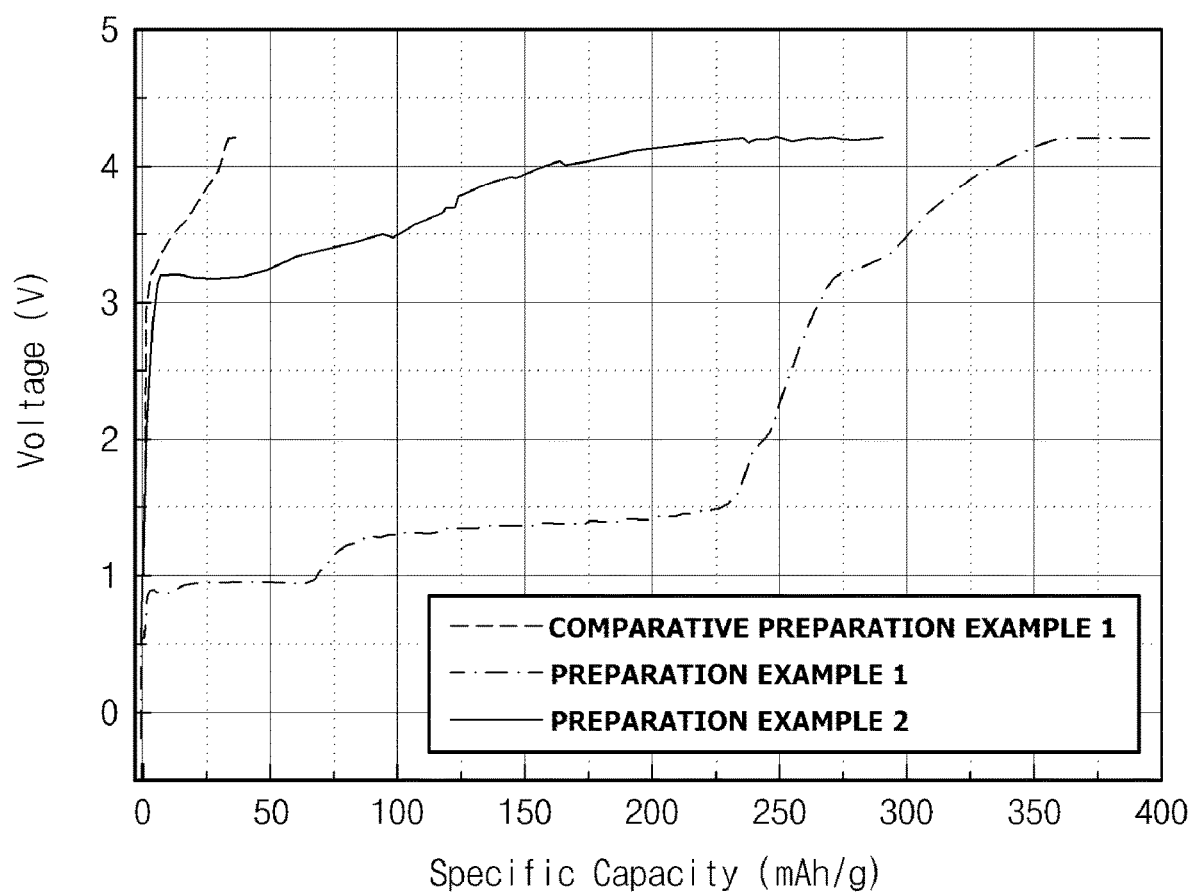

US 10,910,637 B2

POSITIVE ELECTRODE FOR LITHIUM SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2018/007313, filed Jun. 27, 2018, which claims priority to Korean Patent Application No. 2017-0081273, filed on Jun. 27, 2017, and Korean Patent Application No. 2018-0074359, filed on Jun. 27, 2018, the disclosures of which are incorporated herein in their entirety by reference.

TECHNICAL FIELD

The present invention relates to a positive electrode, and a lithium secondary battery including the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

A lithium secondary battery is a secondary battery which is generally composed of a positive electrode including a positive electrode active material, a negative electrode including a negative electrode active material, a separator, and an electrolyte and is charged and discharged by intercalation-deintercalation of lithium ions. Since the lithium secondary battery is advantageous in that it has large electromotive force as well as high energy density and may exhibit high capacity, the lithium secondary battery has been applied to various fields.

Various methods have been studied to achieve higher capacity of the lithium secondary battery. Specifically, a method of achieving high capacity of a lithium secondary battery by using at least one material of LCO, LNMCO, and LMO, as a positive electrode active material included in a positive electrode for a lithium secondary battery, has been attempted. However, in order to actually increase the capacity of the lithium secondary battery, capacity of a negative electrode as well as capacity of the positive electrode must be increased, wherein, for this purpose, a method of using a high capacity silicon-based negative electrode active material as a negative electrode has also been attempted. However, with respect to the silicon-based negative electrode active material, since irreversible capacity is also high, there is a limitation in that charge and discharge efficiency is low. In order to address the limitation of irreversible capacity while using the silicon-based negative electrode active material, the silicon-based active material must be lithiated, but the lithiation may cost a lot.

Accordingly, there is a need to develop a lithium secondary battery which may exhibit high capacity and excellent charge and discharge efficiency and may be prepared at low cost.

DISCLOSURE OF THE INVENTION

Technical Problem

An aspect of the present invention provides a positive electrode in which high capacity and excellent initial capacity of a secondary battery may be achieved by including an additive.

Another aspect of the present invention provides a lithium secondary battery which has excellent charge and discharge efficiency as well as high capacity and may be prepared at low cost without a separate lithiation process by including the positive electrode.

Another aspect of the present invention provides an additive for a positive electrode in which excellent initial capacity of the secondary battery may be achieved by including metal particles and lithium oxide.

Technical Solution

According to an aspect of the present invention, there is provided a positive electrode including: a nickel-containing positive electrode active material; and an additive including metal particles and lithium oxide.

According to another aspect of the present invention, there is provided a lithium secondary battery including the positive electrode, a negative electrode, and a separator disposed between the positive electrode and the negative electrode.

According to another aspect of the present invention, there is provided an additive for a positive electrode which includes metal particles and lithium oxide.

Advantageous Effects

According to the present invention, since an additive including metal particles and lithium oxide is included during the preparation of a positive electrode, the metal particles and the lithium oxide, which are included in the additive, are reacted at less than a driving voltage (2.5 V to 4.3 V) of a lithium secondary battery to form lithium ions and metal oxide, and, among them, the lithium ions move to a negative electrode to lithiate a negative electrode active material. Accordingly, since a separate lithiation process may not be further performed, a lithium secondary battery having excellent capacity may be prepared at low cost.

Also, since the metal oxide formed by the reaction of the metal particles with the lithium oxide may adsorb gas such as CO or $CO_2$, a decrease in stability due to CO or $CO_2$ gas generated during charge and discharge of a cell may be prevented and swelling may also be reduced.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 illustrates charge capacities of test secondary batteries 1 to 3 respectively including Preparation Examples 1 and 2 and Comparative Preparation Example 1.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

Positive Electrode

A positive electrode according to an embodiment of the present invention includes a nickel-containing positive electrode active material; and an additive including metal particles and lithium oxide.

Specifically, with respect to the positive electrode, a composition for forming a positive electrode including a nickel-containing positive electrode active material; and an additive including metal particles and lithium oxide is formed on a positive electrode collector.

The positive electrode collector is not particularly limited as long as it has conductivity without causing adverse chemical changes in a battery, and, for example, stainless steel, aluminum, nickel, titanium, fired carbon, or aluminum or stainless steel that is surface-treated with one of carbon, nickel, titanium, silver, or the like may be used.

The metal particles included in the additive may preferably include at least one selected from the group consisting of iron (Fe), cobalt (Co), chromium (Cr), manganese (Mn), and nickel (Ni). Particularly, in a case in which particles of the at least one metal selected therefrom are included, a nanosized composite having capacity about 4 times higher than that of a conventional lithium transition metal oxide may be formed, and, since the composite has a large charge/discharge voltage hysteresis curve, it may improve initial charge and discharge efficiency when being added as a positive electrode additive.

Also, the lithium oxide included in the additive may include at least one selected from the group consisting of $Li_2O$, $Li_2O_2$, and $LiO_2$.

Since the composition for forming a positive electrode includes the additive including the metal particles and the lithium oxide, the metal particles and the lithium oxide, which are included in the additive, may be electrochemically reacted in a driving voltage range of the additive to form lithium ions and metal oxide. In a case in which the additive forms the lithium ions and the metal oxide, when the additive is used in a secondary battery, the lithium ions move to a negative electrode according to charge and discharge of the secondary battery to further increase capacity of the battery, and the metal oxide may reduce a swelling phenomenon by adsorbing gas, such as CO or $CO_2$, which may be generated during the charge and discharge of the secondary battery.

The metal particles may have an average particle diameter ($D_{50}$) of 5 μm or less, preferably 1 nm to 5 μm or 1 nm to 1 μm, and more preferably 10 nm to 50 nm. In a case in which the average particle diameter of the metal particles is greater than 5 μm, the reaction with the lithium oxide may hardly occur, and, since the reaction with the lithium oxide easily occurs as the average particle diameter of the particles is smaller, preferably, in a nm range, the initial capacity may be further improved.

The average particle diameter ($D_{50}$) of the metal particles may be defined as a particle diameter at a cumulative volume of 50% in a particle size distribution curve. For example, the average particle diameter ($D_{50}$) of the metal particles may be measured by a laser diffraction method. The laser diffraction method may generally measure a particle diameter ranging from a submicron level to a few mm, and may obtain highly repeatable and high resolution results. For example, in the measurement method of the average particle diameter ($D_{50}$) of the metal particles, the metal particles are introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle diameter distribution of the measurement instrument may then be calculated.

For example, the additive may include the metal particles and the lithium oxide in a molar ratio of 1:0.1 to 1:4, preferably 1:0.3 to 1:4, more preferably 1:0.3 to 1:3, and most preferably 1:0.5 to 1:2. In a case in which the metal particles and the lithium oxide are included within the above range, since the metal particles and the lithium oxide, which are included in the additive, may be electrochemically reacted in the driving voltage range of the additive, lithium ions and metal oxide may be easily formed and the capacity of the secondary battery may be further improved when the additive is used in the battery. For example, in a case in which the metal particles and the lithium oxide are included in a molar ratio of less than 1:0.1, since an amount of the lithium oxide with which the metal may react is small, the lithium ions and the metal oxide may not be formed, and thus, capacity may be very low. Accordingly, the capacity may be smaller than that of lithium metal used as a conventional positive electrode. In contrast, in a case in which the metal particles and the lithium oxide are included in a molar ratio of greater than 1:4, since the amount of the lithium oxide reacted is small, the capacity may be very low.

The nickel-containing positive electrode active material included in the composition for forming a positive electrode may include one selected from the group consisting of $LiNiO_2$, $Li_{1+w}(Ni_{1-x-y-z}Co_xM1_yM2_z)O_2$ (where M1 and M2 are each independently any one selected from the group consisting of aluminum (Al), iron (Fe), manganese (Mn), vanadium (V), chromium (Cr), titanium (Ti), tungsten (W), tantalum (Ta), magnesium (Mg), and molybdenum (Mo), 0≤w≤1, 0≤x<1, 0≤y<1, 0≤z<1, and x+y+z<1), $Li_{1+w1}Ni_aCo_bM1_cO_2$ (where M1 is any one selected from the group consisting of Al, Fe, Mn, V, Cr, Ti, W, Ta, Mg, and Mo, 0≤w1≤1, a≥0.6, 0≤b<1, 0≤c<1, and a+b+c=1), and a combination thereof. Specifically, the nickel-containing positive electrode active material may preferably include nickel in a large amount of 60 mol % or more based on the total number of moles of transition metal oxide included in the nickel-containing positive electrode active material. For example, the nickel-containing positive electrode active material may be $LiNi_{0.8}Co_{0.1}Mn_{0.1}O_2$ or $LiNi_{0.6}Co_{0.2}Mn_{0.2}O_2$, but the present invention is not limited thereto.

The nickel-containing positive electrode active material may be included in an amount of 1 part by weight to 99 parts by weight, preferably 30 parts by weight to 99 parts by weight, and more preferably 50 parts by weight to 99 parts by weight based on a total weight of the positive electrode.

An amount of the additive included in the composition for forming a positive electrode may be controlled depending on irreversible capacity of the negative electrode. For example, the additive may be included in an amount of 0.1 parts by weight to 100 parts by weight, preferably 1 part by weight to 50 parts by weight, more preferable 1 part by weight to 10 parts by weight, and most preferably 3 parts by weight to 7 parts by weight based on a total weight of the composition for forming a positive electrode. For example, in a case in which the additive is included in an amount of less than 0.1 parts by weight based on the total weight of the composition for forming a positive electrode, it may be difficult to achieve the formation of lithium ions due to the addition of the additive and the resultant effect of increasing the capacity and initial capacity of the secondary battery.

Also, the positive electrode may further include a conductive agent and a binder.

The binder is a component that assists in the binding between the active material and the conductive agent and in the binding with the current collector, wherein the binder is typically added in an amount of 1 wt % to 30 wt % based on a total weight of solid content of the composition for forming a positive electrode. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent may be typically added in an amount of 1 wt % to 30 wt % based on the total weight of the solid content of the composition for forming a positive electrode.

The conductive agent is not particularly limited as long as it has conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. Specific examples of a commercial conductive agent may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The positive electrode may be prepared according to a typical method of preparing a positive electrode except that the above-described composition for forming a positive electrode is used. Specifically, the above-described composition for forming a positive electrode is coated on the positive electrode collector, and the positive electrode may then be prepared by drying and rolling the coated positive electrode collector.

Also, as another method, the positive electrode may be prepared by casting the composition for forming a positive electrode on a separate support and then laminating a film separated from the support on the positive electrode collector.

Secondary Battery

Furthermore, the present invention provides a lithium secondary battery including the above-described positive electrode, a negative electrode, and a separator disposed between the positive electrode and the negative electrode.

The lithium secondary battery specifically includes a positive electrode, a negative electrode disposed to face the positive electrode, a separator disposed between the positive electrode and the negative electrode, and an electrolyte. Also, the lithium secondary battery may further selectively include a battery container accommodating an electrode assembly of the positive electrode, the negative electrode, and the separator, and a sealing member sealing the battery container.

Since the positive electrode is the same as described above, detailed descriptions thereof will be omitted, and the remaining configurations will be only described in detail below.

The negative electrode, for example, may be prepared by coating a negative electrode collector with a composition for forming a negative electrode which includes a silicon-based negative electrode active material, a binder, a conductive agent, and a solvent.

For example, the silicon-based negative electrode active material may include at least one selected from the group consisting of silicon (Si) and $SiO_x$ ($0<x\leq2$).

Also, in addition to the silicon-based negative electrode active material, the negative electrode may further include a compound capable of reversibly intercalating and deintercalating lithium. Specific examples of the compound may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as a negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, mesocarbon microbeads, mesophase pitches, and high-temperature sintered carbon such as petroleum or coal tar pitch derived cokes.

Preferably, the negative electrode may include a silicon-based negative electrode active material having high irreversible capacity and a carbon-based negative electrode material.

The negative electrode active material may be included in an amount of 1 wt % to 99 wt %, preferably 50 wt % to 99 wt %, and more preferably 80 wt % to 99 wt % based on a total weight of solid content of the composition for forming a negative electrode.

Also, the negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Furthermore, the negative electrode collector may typically have a thickness of 3 μm to 500 μm, and, similar to the positive electrode collector, microscopic irregularities may be formed on the surface of the collector to improve the adhesion of the negative electrode active material. The negative electrode collector, for example, may be used in various shapes such as that of a film, a sheet, a foil, a net, a porous body, a foam body, a non-woven fabric body, and the like.

The binder is a component that assists in the binding between the conductive agent, the active material, and the current collector, wherein the binder is typically added in an amount of 1 wt % to 30 wt %, for example, 1 wt % to 20 wt % based on the total weight of the solid content of the composition for forming a negative electrode. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 1 wt % to 20 wt %, for example, 1 wt % to 10 wt % based on the total weight of the solid content of the composition for forming a negative electrode. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include water or an organic solvent, such as N-methyl-2-pyrrolidone (NMP), and may be used in an amount such that desirable viscosity is obtained when the negative electrode active material as well as selectively the binder and the conductive agent is included. For example, the solvent may be included in an amount such that a concentration of the solid content including the negative electrode active material as well as selectively the binder and the conductive agent is in a range of 50 wt % to 95 wt %, for example, 70 wt % to 90 wt %.

In a case in which the negative electrode including the silicon-based negative electrode active material is used, high capacity may be achieved when the negative electrode is used in the battery, but energy density of the secondary battery may be reduced due to high irreversible capacity of the silicon-based negative electrode active material.

Since the positive electrode, which includes the above-described additive including metal particles and lithium oxide, is included in addition to the negative electrode including the silicon-based negative electrode active material, lithium ions, which are formed by the reaction of the metal particles with the lithium oxide included in the positive electrode in the driving voltage range of the additive, move to the negative electrode to lithiate the negative electrode, and thus, the irreversible capacity of the negative electrode may be reduced.

Specifically, a driving voltage of a general battery is in a range of 2.5 V to 4.3 V, wherein, in a case in which a driving voltage of the positive electrode active material included in the positive electrode is outside the driving voltage range of the battery, the positive electrode active material does not participate in the electrochemical reaction.

In an embodiment, a driving voltage of the positive electrode active material is in a range of 2.5 V to 4.3 V, and a driving voltage of the additive is in a range of less than 2.5 V, for example, 0.5 V to less than 2.5 V.

The driving voltage denotes a voltage at which lithium ions are deintercalated when the voltage is applied and may preferably denote a voltage at which the deintercalated lithium ions move to the negative electrode.

That is, in a case in which the battery is charged to less than 2.5 V, i.e., less than the driving voltage range of the positive electrode active material, the electrochemical reaction of the positive electrode active material does not occur, but electrochemical reaction between the metal particles and the lithium oxide, which are included as the additive in the composition for forming a positive electrode, occurs. That is, the additive including the metal particles and the lithium oxide, which is included in the positive electrode, is reacted in less than the driving voltage range of the positive electrode active material (less than 2.5 V) to form lithium ions and metal oxide, and the lithium ions formed in this case move to the negative electrode and intercalate into the negative electrode active material to lithiate the negative electrode, and, thus, the irreversible capacity of the negative electrode is reduced.

In addition, since the gas, such as CO or $CO_2$, which may be generated during a charge and discharge process, is adsorbed by the metal oxide formed after the reaction, the swelling phenomenon of the battery may be reduced.

Specifically, in a case in which Fe particles and $Li_2O$ are used as the additive included in the composition for forming a positive electrode, electrochemical reactions, such as the following Formulae 1 to 3, between the Fe particles and the $Li_2O$ occur at less than 2.5 V.

$$2Fe + 3Li_2O \rightarrow Li_2Fe_2O_3 + 4Li^+ + 4e^- \quad (1)$$

$$Li_2Fe_2O_3 \rightarrow \alpha\text{-}Li_2Fe_2O_3 + Li^+ + e^- \quad (2)$$

$$\alpha\text{-}Li_2Fe_2O_3 \rightarrow Fe_2O_3 + Li^+ + e^- \quad (3)$$

In this case, $Fe_2O_3$, which is finally formed, remains in the positive electrode and adsorbs the gas, which may be generated during the charge and discharge process, to reduce the swelling phenomenon of the battery, and the lithium ions move to the negative electrode to lithiate the negative electrode.

According to the reactions as described above, the irreversible capacity of the negative electrode may be reduced even if a separate lithiation process is not performed on the negative electrode, and, as a result, the effect of increasing the capacity and initial capacity of the secondary battery may be achieved.

Also, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator included in the secondary battery. Furthermore, a typical porous nonwoven fabric, for example, a nonwoven fabric formed of high melting point glass fibers or polyethylene terephthalate fibers may be used, but the separator is not limited thereto.

In this case, an organic-inorganic composite separator further coated with an inorganic material for securing heat resistance or mechanical strength may be used, and the separator having a single layer or multilayer structure may be selectively used.

The inorganic material may be used without particular limitation as long as it is a material which may play a role in uniformly controlling pores of the organic-inorganic composite separator and improving heat resistance. For example, non-limiting examples of the inorganic material may be at least one selected from the group consisting of $SiO_2$, $Al_2O_3$, $TiO_2$, $BaTiO_3$, $Li_2O$, LiF, LiOH, $Li_3N$, BaO, $Na_2O$, $Li_2CO_3$, $CaCO_3$, $LiAlO_2$, $SrTiO_3$, $SnO_2$, $CeO_2$, MgO, NiO, CaO, ZnO, $ZrO_2$, SiC, derivatives thereof, and a mixture thereof.

An average diameter of the inorganic material may be in a range of 0.001 μm to 10 μm, for example, 0.001 μm to 1 μm. When the average diameter of the inorganic material is within the above range, dispersibility in the coating solution may be improved and the occurrence of problems in a coating process may be minimized. Also, physical properties of the final separator may not only be homogenized, but also inorganic particles may be uniformly distributed on pores of nonwoven fabric to improve mechanical properties of the nonwoven fabric, and a size of pores of the organic-inorganic composite separator may be easily adjusted.

An average diameter of the pores of the organic-inorganic composite separator may be in a range of 0.001 μm to 10 μm, for example, 0.001 μm to 1 μm. When the average diameter of the pore of the organic-inorganic composite separator is within the above range, gas permeability and ion conductivity may not only be controlled to desired ranges, but a possible internal short-circuit of the battery due to the contact between the positive electrode and the negative electrode may also be eliminated when the battery is prepared by using the organic-inorganic composite separator.

A porosity of the organic-inorganic composite separator may be in a range of 30 vol % to 90 vol %. In a case in which the porosity is within the above range, the ion conductivity may be increased and mechanical strength may be improved.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Preparation Example 1

Fe having an average particle diameter of 50 nm and $Li_2O$ powder were mixed in a molar ratio of 1:1.5 to prepare an irreversible positive electrode additive.

Preparation Example 2

Fe having an average particle diameter of 5 μm and $Li_2O$ powder were mixed in a molar ratio of 1:1.5 to prepare an irreversible positive electrode additive.

Comparative Preparation Example 1

100% of Li$_2$O powder was used to prepare an irreversible positive electrode additive.

Example 1

(Positive Electrode Preparation)

97.5 parts by weight of a LiNi$_{0.8}$Mn$_{0.1}$Co$_{0.1}$O$_2$ positive electrode active material, 1 part by weight of FX35 produced by Denka Company Limited as a conductive agent, and 1.5 parts by weight of DA288 (KUREHA Corporation), as a binder, were mixed in a solvent, and 1 part by weight of the irreversible positive electrode additive prepared in Preparation Example 1 was mixed in the solvent based on a total weight of solid content of the mixture to prepare a composition for forming a positive electrode. A 20 μm thick positive electrode collector (Al thin film) was coated with the composition at a loading amount of 6 mAh/cm$^2$, dried, and roll-pressed to prepare a positive electrode.

(Negative Electrode Preparation)

94.2 parts by weight of a mixed negative electrode active material in which a graphite negative electrode active material and a SiO negative electrode active material were mixed in a ratio of 70:30, 2.5 parts by weight of A544 (ZEON Corporation) as a binder, 2 parts by weight of Super C65 (Timcal Graphite & Carbon) as a conductive agent, and 1.3 parts by weight of Daicel 2000 (Daicel Corporation), as a thickener, were mixed and added to water, as a solvent, to prepare a composition for forming a negative electrode. A 20 μm thick negative electrode collector (Cu thin film) was coated with the composition for forming a negative electrode, dried, and roll-pressed to prepare a negative electrode.

(Secondary Battery Preparation)

After the positive electrode and the negative electrode, which were prepared by the above-described methods, were stacked with a separator to prepare an electrode assembly, the electrode assembly was put in a battery case, an electrolyte solution was injected thereinto, and the battery case was sealed to prepare a lithium secondary battery.

Example 2

A positive electrode, a negative electrode, and a lithium secondary battery including the positive electrode and the negative electrode were prepared in the same manner as in Example 1 except that 2 parts by weight of the irreversible positive electrode additive prepared in Preparation Example 1 was used.

Example 3

A positive electrode, a negative electrode, and a lithium secondary battery including the positive electrode and the negative electrode were prepared in the same manner as in Example 1 except that 3 parts by weight of the irreversible positive electrode additive prepared in Preparation Example 1 was used.

Example 4

A positive electrode, a negative electrode, and a lithium secondary battery including the positive electrode and the negative electrode were prepared in the same manner as in Example 1 except that 4 parts by weight of the irreversible positive electrode additive prepared in Preparation Example 1 was used.

Example 5

A positive electrode, a negative electrode, and a lithium secondary battery including the positive electrode and the negative electrode were prepared in the same manner as in Example 1 except that 5 parts by weight of the irreversible positive electrode additive prepared in Preparation Example 1 was used.

Example 6

A positive electrode, a negative electrode, and a lithium secondary battery including the positive electrode and the negative electrode were prepared in the same manner as in Example 1 except that 6 parts by weight of the irreversible positive electrode additive prepared in Preparation Example 1 was used.

Example 7

A positive electrode, a negative electrode, and a lithium secondary battery including the positive electrode and the negative electrode were prepared in the same manner as in Example 1 except that 7 parts by weight of the irreversible positive electrode additive prepared in Preparation Example 1 was used.

Comparative Example 1

A positive electrode, a negative electrode, and a lithium secondary battery including the positive electrode and the negative electrode were prepared in the same manner as in Example 1 except that the additive was not included in the composition for forming a positive electrode.

Experimental Example 1: Confirmation of Irreversibility of Irreversible Additive Each of the irreversible positive electrode additives prepared in Preparation Examples 1 and 2 and Comparative Preparation Example 1, a conductive agent, and a binder were mixed in a weight ratio of 80:10:10 in a solvent to respectively prepare irreversible additive compositions 1 to 3. A positive electrode collector was coated with each composition, dried, and roll-pressed to prepare test positive electrodes 1 and 2 and comparative test positive electrode 1 for checking irreversibility of the irreversible additives prepared in Preparation Examples 1 and 2 and Comparative Preparation Example 1. In this case, the same materials as those in Example 1 were used as the conductive agent, the binder, and the solvent, respectively.

A negative electrode and test secondary batteries 1 to 3 including the same were respectively prepared in the same manner as in Example 1 except that test positive electrodes 1 and 2 and comparative test positive electrode 1 were respectively used.

Each of test secondary batteries 1 to 3 thus prepared was charged at a constant current of 0.1 C to a voltage of 4.2 V at 25° C., and, thereafter, was charged at a constant voltage of 4.2 V to a current of 0.1 mAh. After test secondary batteries 1 to 3 were left standing for 60 minutes, each of test secondary batteries 1 to 3 was discharged at a constant current of 0.1 C to a voltage of 2.5 V to measure capacity in the first cycle.

In this regard, FIG. 1 illustrates charge and discharge capacities of test secondary batteries 1 to 3 respectively including test positive electrodes 1 and 2 and comparative test positive electrode 1. As illustrated in FIG. 1, with respect to test secondary batteries 1 to 3, it may be confirmed that discharge capacity was not measured and charge capacity only appeared. Accordingly, it may be confirmed that the irreversible positive electrode additives prepared in Preparation Examples 1 and 2 and Comparative Preparation Example 1 exhibited irreversibility. Also, with respect to the irreversible positive electrode additives prepared in Preparation Examples 1 and 2, it may be confirmed that charge capacities were significantly higher than that of the positive electrode additive prepared in Comparative Preparation Example 1. The reason for this is that, since the irreversible positive electrode additives prepared in Preparation Examples 1 and 2 included metal particles as well as lithium oxide, the charge capacities of the irreversible positive electrode additives were improved due to the reaction of the metal particles with the lithium oxide. In addition, it may be confirmed that the charge capacity of the irreversible positive electrode additive prepared in Preparation Example 1 was higher than that prepared in Preparation Example 2. The reason for this is that, since the reaction with the lithium oxide easily occurred as the average particle diameter of the metal particles included in the irreversible positive electrode additive was smaller, initial capacity was further improved.

Experimental Example 2: Characterization of Secondary Battery

The batteries prepared in Examples 1 to 7 and Comparative Example 1 were charged at a constant current of 0.1 C to a voltage of 4.2 V at 25° C., and, thereafter, were charged at a constant voltage of 4.2 V to a current of 0.1 mAh. After the batteries were left standing for 60 minutes, the batteries were discharged at a constant current of 0.1 C to a voltage of 2.5 V to measure capacity in the first cycle, and energy densities of the secondary batteries were measured by simulating the capacities measured.

The results thereof are presented in Table 1.

TABLE 1

| | Energy density (Wh/L) |
|---|---|
| Example 1 | 805.2 |
| Example 2 | 817.7 |
| Example 3 | 830.4 |
| Example 4 | 843.1 |
| Example 5 | 847.1 |
| Example 6 | 842.3 |
| Example 7 | 836.6 |
| Comparative Example 1 | 792.7 |

As illustrated in Table 1, with respect to Examples 1 to 7 which included the metal particles and the lithium oxide as the additive in the nickel-containing positive electrode active material, it may be confirmed that energy densities were better than that of the secondary battery of Comparative Example 1 in which the additive was not used.

The reason for this is that, with respect to Examples 1 to 7, since the metal particles and the lithium oxide, which were included as the irreversible additive in the nickel-containing positive electrode active material, were electrochemically reacted during initial charge (less than 2.5 V) and lithium ions formed by the reaction moved to the negative electrode, an excessive amount of lithium was intercalated into the negative electrode during the initial charge to lithiate the negative electrode, and thus, irreversible capacity of the negative electrode was reduced.

With respect to Comparative Example 1, since the irreversible additive was not included, lithium may not be additionally provided to the negative electrode in addition to lithium released from the positive electrode during the initial charge, and thus, initial capacity was also lower than those of Examples 1 to 7 according to the present invention.

The invention claimed is:

1. A positive electrode comprising:
a nickel-containing positive electrode active material; and
an additive including metal particles and lithium oxide,
wherein the metal particles are selected from the group consisting of iron (Fe), chromium (Cr), manganese (Mn), nickel (Ni), and a combination thereof, and
the lithium oxide is selected from the group consisting of $Li_2O$, $Li_2O_2$, $LiO_2$, and a combination thereof.

2. The positive electrode of claim 1, wherein the metal particles and the lithium oxide are included in a molar ratio of 1:0.1 to 1:4.

3. The positive electrode of claim 1, wherein the nickel-containing positive electrode active material is included in an amount of 1 part by weight to 99 parts by weight based on a total weight of the positive electrode.

4. The positive electrode of claim 1, wherein the additive is included in an amount of 0.1 parts by weight to 100 parts by weight based on a total weight of the positive electrode.

5. The positive electrode of claim 1, wherein a driving voltage of the nickel-containing positive electrode active material is in a range of 2.5 V to 4.3 V.

6. The positive electrode of claim 1, wherein a driving voltage of the additive is less than 2.5 V.

7. The positive electrode of claim 1, wherein the metal particles have an average particle diameter of 5 μm or less.

8. The positive electrode of claim 1, further comprising a conductive agent and a binder.

9. A lithium secondary battery comprising the positive electrode of claim 1, a negative electrode, and a separator disposed between the positive electrode of claim 1 and the negative electrode.

10. The lithium secondary battery of claim 9, wherein the negative electrode comprises a silicon-based negative electrode active material.

11. The lithium secondary battery of claim 9, wherein the additive in the positive electrode including metal particles and lithium oxide is reacted in less than a driving voltage of the nickel-containing positive electrode active material to form lithium ions and metal oxide, and the lithium ions move to the negative electrode.

12. The lithium secondary battery of claim 11, wherein the driving voltage of the nickel-containing positive electrode active material is in a range of 2.5 V to 4.3 V.

13. The lithium secondary battery of claim 11, wherein a driving voltage of the additive is less than 2.5 V.

14. An additive for a positive electrode, the additive comprising metal particles and lithium oxide
wherein the metal particles are selected from the group consisting of iron (Fe), chromium (Cr), manganese (Mn), nickel (Ni), and a combination thereof, and
wherein the lithium oxide is selected from the group consisting of $Li_2O$, $Li_2O_2$, $LiO_2$, and a combination thereof.

15. The additive for a positive electrode of claim 14, wherein the metal particles and the lithium oxide are included in a molar ratio of 1:0.1 to 1:4.

* * * * *